United States Patent [19]

Howe et al.

[11] 4,336,545
[45] Jun. 22, 1982

[54] OPTICAL DISC STRUCTURE, METHOD AND APPARATUS PHYSICALLY OPTIMIZED FOR WRITING AND READING WITH A SINGLE WAVELENGTH

[75] Inventors: Dennis G. Howe, Pittsford; Alan B. Marchant; Joseph J. Wrobel, both of Rochester, all of N.Y.

[73] Assignee: Eastman Kodak Company, Rochester, N.Y.

[21] Appl. No.: 217,646

[22] Filed: Dec. 18, 1980

[51] Int. Cl.$^3$ .................. G01D 9/00; G01D 15/34
[52] U.S. Cl. .................................. 346/1.1; 346/135.1
[58] Field of Search .................. 346/76 L, 135.1; 358/128.5, 297

[56] References Cited

U.S. PATENT DOCUMENTS

| 4,023,185 | 5/1977 | Bloom et al. | 346/135 |
| 4,097,895 | 6/1978 | Spong | 358/128 |
| 4,139,853 | 2/1979 | Ghekiere et al. | 346/1 |
| 4,222,071 | 9/1980 | Bell et al. | 358/128.5 |
| 4,270,130 | 5/1981 | Houle et al. | 346/135.1 X |

FOREIGN PATENT DOCUMENTS 46-24556 7/1971 Japan.
2015804 9/1979 United Kingdom.

OTHER PUBLICATIONS

A. E. Bell and F. W. Spong, "Antireflection Structures for Optical Recording", *IEEE Journal of Quantum Electronics*, pp. 487-495, 7/78.

Primary Examiner—Donald A. Griffin
Attorney, Agent, or Firm—John D. Husser

[57] ABSTRACT

A recording element adapted for real-time writing and reading with light of a single given wave-length utilizes a recording stratum, including a heat-deformable dye-binder layer, overlying a reflective support and is characterized by the dye-binder layer having optical constants such that its reflectance versus thickness variation curve has a first reflectance minimum having a high depth of modulation and the recording stratum having a nominal thickness sufficiently greater than the thickness corresponding to the first reflectance minimum to effect reflection of a significant portion of light of such given wavelength.

44 Claims, 14 Drawing Figures

FIG. 2

PRIOR ART

FIG. 7a 100% DYE

FIG. 7b 71% DYE

FIG. 7c 46% DYE

FIG. 7d 35% DYE

FIG. 7e 25% DYE

FIG. 7f 16% DYE

FIG. 7g 8% DYE

FIG. 7h 0% DYE

OPTICAL DISC STRUCTURE, METHOD AND APPARATUS PHYSICALLY OPTIMIZED FOR WRITING AND READING WITH A SINGLE WAVELENGTH

CROSS-REFERENCE TO RELATED APPLICATIONS

Reference is made herein to U.S. patent application Ser. No. 023,434, entitled "Medium for Recording by Thermal Deformation" and filed Mar. 23, 1979 in the names of H. T. Thomas and J. J. Wrobel; U.S. patent application Ser. No. 001,519, entitled "Improved Thermal Deformation Record Device" and filed Jan. 8, 1979 in the names of C. G. Houle, D. G. Howe, H. T. Thomas, J. J. Wrobel and B. G. Fike; U.S. patent application Ser. No. 124,381, entitled "Physically Optimized Optical Disc Structure, Method and Apparatus", and filed Feb. 25, 1980 in the names of D. G. Howe and J. J. Wrobel; U.S. patent application Ser. No. 124,382, entitled "α,α'-Bis-(Dialkylaminobenzylidene) Ketone Dyes And Their Use in Optical Recording Elements", and filed Feb. 25, 1980 in the names of Specht and Thomas and U.S. patent application Ser. No. 161,486, entitled "Apparatus and Method for Reading Optical Discs" and filed June 20, 1980 in the name of D. G. Howe.

BACKGROUND OF THE INVENTION

1. Field of the Invention

The present invention relates to the real-time, optical writing and reading of high density information and more particularly to heat-deformation media, methods and apparatus for such writing and reading with light of a single wavelength. As will be apparent to those skilled in the art, the term "light" is used herein in its general sense, i.e., to include electromagnetic radiation within the visible range as well as such radiation outside that range that is useful in practice of the present invention.

2. Description of the Prior Art

In general, high density optical storage media carry information in the form of tracks of small (usually on the order of a micron or less in size), optically-detectable marks formed in the surface of a substrate or in thin material layer(s) deposited on a substrate. Information is recovered (read) by scanning the tracks with a tightly focused spot of light, e.g., from a laser. The recovered information is in the form of a fluctuating electrical signal obtained from a photodetector that senses the read-out light after it has been modulated by the track markings.

There have been a variety of approaches for achieving the general functions outlined above. Although there are others, the most popular storage media format has been a disc with a single spiral track or concentric circular tracks. For convenience, this discussion will refer to the storage media as optical discs, with the understanding that other such record element formats are, in general, equivalent as to utility with the present invention.

With regard to record formation, i.e., recording or writing on optical discs, approaches can be divided as: (1) real-time discs (ones ready for reading immediately after writing) or (2) processed discs (ones requiring further processing after recording before they can be read). Typical of the prior art real-time disc type are heat-deformable elements comprising a substrate bearing a very thin metal or dye layer that is deformed (e.g., displaced or ablated) by the heat generated from an absorbed writing laser beam, which is modulated in intensity according to the signal to be recorded. Typical of the processed disc type are ones formed by: (1) recording exposure of a photosensitive material, such as positive photoresist; (2) chemical development of that material to form a relief pattern and (3) metallization of the relief pattern.

With regard to reading approach, the optical discs can, in one manner, be classified as being of a transmissive or reflective type, depending on whether or not the reading light beam passes completely through the disc or is reflected to a detector on the same side of the disc as the reading light source. The reflective type offers potential simplicity by allowing a single lens to both focus the reading beam on the disc and collect the modulated light returned from the disc.

A more subtle distinction of the disc read-out approaches can be made based on the type of predominating interaction between the focused reading light spot and the recorded marks on the disc. Thus, approaches that obtain a signal based primarily on differences in the electric field amplitude of reading light leaving the marked and unmarked portions of the disc (e.g, because of optical density variations) can be classified as amplitude variation systems. Systems of this type can be written in real-time or be processed. In distinction, approaches which obtain a signal based primarily on differences or transitions in the phase of reading light leaving marked and non-marked portions of a disc can be characterized as phase shift systems. Systems of this type heretofore have not readily been formed in real-time.

In U.S. application Ser. No. 124,381, there is disclosed an improved optical disc which is designed for real-time, heat-deformation recording and which is physically optimized for high sensitivity writing and high contrast, phase shift reading. One significant aspect of that invention is that the recording layer (1) exhibits, at the reflected reading light wavelength, a non-linear relative-phase-shift to recording layer thickness relation characterized by distinct thickness zones of relatively gradual change and relatively rapid change in reflected light phase and (2) has a nominal thickness proximate a transition between such zones. The disclosed disc also is optimized for recording with light of a wavelength different from that used for reading to enhance writing sensitivity, i.e., to reduce requisite writing power. That invention evolved in part from recognition of the utility of the above-described phase shift versus recording layer thickness characteristic in connection with phase interference reading (which is to be distinguished from amplitude variation reading that was traditionally used in real-time write and read systems).

In addition to providing improved writing sensitivity and reading contrast, the approach of the previous application obviated various problems connected with prior art real-time recording systems. For example, in such prior systems it was necessary to reduce the reading light power to avoid re-melting or ablating the recording layer during read-out. Also, when compared to such prior art amplitude systems, the phase interference reading approach enabled high depth of modulation read-out with larger reading spot sizes and less critical focusing and tracking. Although the specific embodiments disclosed in the previous application Ser. No. 124,381 were of discs optimized for writing and reading with different wavelengths, it was noted that certain advantageous features of that invention could be retained in systems using the same wavelength for writing and reading. This would be desirable for some applications where the added cost and complexity of two separate laser devices is not warranted.

An alternative approach for allowing the use of a single writing and reading beam is disclosed in U.S. application Ser. No. 001,519. In accordance with the teaching of that application, the absorption of the recording layer to writing light is reduced, after the recording of information, to a level such that the same light wavelength can be used for reading at a power level that provides useful signal-to-noise levels but without any deleterious re-melting or ablation of the recording layer.

SUMMARY OF THE INVENTION

The present invention pertains to an improved real-time recordable, optical disc and to associated methods and apparatus which implement certain desirable aspects of the approach disclosed in U.S. application Ser. No. 124,381, but in an embodiment that is optimized for writing and reading with a single wavelength of light. The disc, apparatus and method of the present invention provide several distinct advantages over previous systems and media designed for writing and reading with the same light wavelength.

In general, the present invention provides a record element having a heat-deformable recording layer overlying a reflectively surfaced support, the recording layer having optical constants and nominal thickness with respect to a predetermined write-read wavelength such that the record element has a substantial absorption to said wavelength but also reflects a significant minor proportion of such write-read wavelength. The nominal thickness of the recording layer also is selected so as to be proximate a transition between zones of relatively gradual and relatively rapid change in the phase shift to thickness relation of the recording layer material at the chosen wavelength. Pits can thus be recorded in the recording layer to a depth which provides (1) a desired phase difference between light reflected from pitted and non-pitted disc portions and (2) an approximate amplitude equality between light reflected from such pitted and non-pitted portions. Immediately after recording, such a disc will constitute, with respect to the write-read wavelength, a phase shift type system.

It is an advantageous characteristic of the disc of the present invention, that as the recording layer subsequently decreases in its absorption to the write-read wavelength, e.g., upon repeated reading with the chosen wavelength, the phase difference between the light from pitted and non-pitted portions remains effectively the same. Thus as dye fading occurs, the read signal strength is not reduced. Prior to fading of the absorptance of the recording layer, the disc must be read at reduced power levels so that no re-melting or ablating of the recording layer occurs; but reading power can be increased after the absorption has been substantially decreased.

In accord with another advantageous feature, this system provides substantial light returned (reflected) from the disc prior to recording, an important feature for optical focus and tracking servo operation; but this substantial reflectance from unrecorded areas does not diminish the contrast or depth of modulation of the recording since the recorded information is carried in a phase shift type system.

Although discs in accord with the present invention are substantially reflective prior to recording, they can still possess high recording sensitivity. This is accomplished by designing the system to have high absorption (at the write-read wavelength) in the vicinity of the upper surface portion of the recording (dye/binder) layer even though light absorbed in the total thickness of the recording layer is decreased somewhat. Thus, high absorption is maintained in that depth of the recording layer that is equal to the depth of the marks (pits) that are to be made.

BRIEF DESCRIPTION OF THE DRAWINGS

Further aspects and advantages of the present invention will become apparent from the following more detailed description with reference to the attached drawings in which.

DETAILED DESCRIPTION OF THE PREFERRED EMBODIMENTS

Before proceeding in more detail with the description of the general approach and preferred embodiments of the present invention, it will be useful to describe in more detail the general approach of prior art real-time, single wavelength systems and their problems which the present invention aims to minimize.

Figure 1:
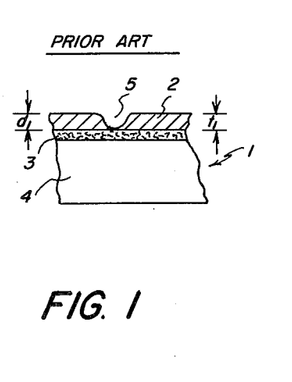
FIG. 1 is a cross-sectional view of a portion of a prior art optical disc structure.

The prior art disc shown in FIG. 1 is exemplary of the amplitude variation read-out type and typically has a thin light absorptive layer 2 overlying a reflective layer 3 on a support 4. The layer 2 can be formed by vapor depositing a dye that is absorptive to the write-read wavelength, e.g., to a thickness in the order of 200 to 1000 Angstroms. Focused light of the write-read wavelength and having high irradiance is used to ablate the layer to form the pit 5, thereby locally reducing the thickness of layer 2 and increasing the reflectance of the recorded pit area. Upon read-out, with light of the write-read wavelength but at reduced intensity, the light is highly reflected from the pit areas but absorbed in non-pit areas. This variation in the electric field strength, or amplitude, of the light reflected from the recorded disc is sensed by a far field detector, i.e., a detector that is located many wavelengths of light away. In such prior art amplitude variation systems, any phase differences in the light that returns to the detector from pitted and non-pitted (i.e., recorded and non-recorded) portions is neglected.

Figure 2:
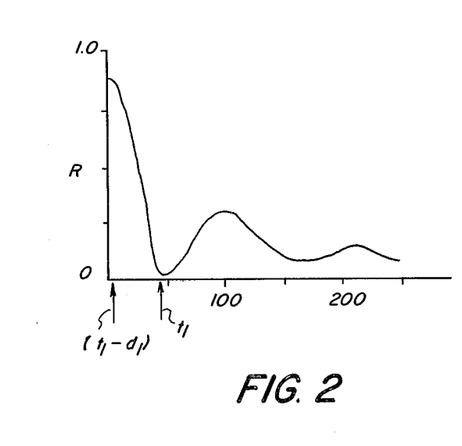
FIG. 2 is a graph illustrating the variation, with respect to recording layer thickness, of the reflectance of write-read light from a disc such as shown in FIG. 1.

Considering this prior art approach in more detail, one significant aim has been to effectively couple writing energy into the recording layer. A discussion of how writing energy can be effectively coupled into the recording layer by proper selection of layer thickness is presented by A. E. Bell and F. W. Spong in the July, 1978 issue of *IEEE Journal of Quantum Electronics* at page 487. In general, this article explains that optimal write situations (i.e., high absorption of writing light within a recording layer such as layer 2 in FIG. 1) exist when strong destructive interference, i.e., a substantial antireflection condition, exists between writing light reflected back through layer 2 from layer 3 and light initially incident on, and reflected from, the upper surface of layer 2. This condition can be obtained by designing the record layer with its nominal optical thickness about one-fourth the wavelength of the recording light in that layer, and by selecting the absorption parameter of the layer 2 so that the amplitude of the internally reflected light that twice traverses layer 2 approximately equals that of the light reflected from the surface of layer 2. The graph of FIG. 2 illustrates how the net reflectance of record wavelength light from an element such as shown in FIG. 1 varies as a function of recording layer thickness. The above-mentioned article further explains that such a nominal thickness also provides good signal-to-noise ratios for read-out with light of the write-read wavelength if the pit depth formed during writing substantially disrupts the antireflection condition. (The preferred pit depth condition removes substantially all of the recording layer 2 above the reflective layer 3.)

Summarizing then, the previous approach has been to select the nominal recording layer thickness to coincide with the first reflective minimum of the write-read light wavelength reflection versus thickness curve. This causes maximum energy to be coupled into the recording layer, aiming to ablate away as much as possible of the recording layer locally at the pit positions. When read back with the same wavelength a good contrast in amplitude is provided between pitted and non-pitted portions. Referring to FIG. 2, this prior art approach suggests that the recording layer 2 have a nominal thickness as indicated by the arrow at $t_1$ in FIG. 2. That is, the nominal thickness should be at a minimum of the reflectance curve R, slightly less than 50 nm in the example shown. The pit depth $d_1$ should be such as to substantially bare the reflective layer 3, so that the residual layer thickness optimally would have a value such as indicated by the arrow at $(t_1-d_1)$ in FIG. 2. The sensed amplitude difference between the light reflected from portions of thickness $t_1$ and those of thickness $(t_1-d_1)$ would then be substantial.

There are however several potential problems with such prior art approaches. In regard to the read-out operation, the reading light power must be lowered so as not to ablate or substantially bleach (in the case of a dye based recording layer) the unpitted portions of recording layer 2. Also in order to achieve maximum depth of modulation during read-out, the read spot size for such amplitude read-out systems should be no larger than the pit size. This necessitates accurate tracking and focus control.

With respect to writing, there are other potential difficulties. It is extremely difficult to completely ablate the entire recording layer in pit portions. This problem occurs because the reflective layer acts as a heat sink for the lower layer portions. Also, a minimum in the distribution of light (vertically through the recording layer) caused by optical interference effects usually occurs deep within the recording layer near the reflector layer interface. This reduces the amount of light absorbed in the lower regions of the recording layer (i.e., in the vicinity of the recording layer/reflector layer interface). This tends to reduce heat generated deep in the recording layer and limit the depth of recorded pits. Such difficulties can be lessened by providing a transparent heat barrier layer over the reflective layer, but this complicates disc fabrication. The extent to which the recording layer remains in the recording pits (because pits do not form readily through the entire recording layer depth) affects the read-out signal contrast.

The difficulty in completely ablating the pit portions is compounded because the surface of such prior art discs does not afford a good reference for focus control of the writing light spot. That is, since the write-read light is substantially absorbed by the recording layer of nominal thickness $t_1$, little light will be available (reflected) to operate focus control servo mechanisms, which require light returned from the disc to generate their focus error signal.

There is one further difficulty which has existed with such a prior art approach when using a dye or analogous light-absorbing material in the recording layer. Even though the power of reading light may be reduced to avoid melting the non-pitted record layer portions, continual re-readings, or perhaps even exposure to ambient light conditions, can cause fading or bleaching of the entire recording layer. As this occurs the difference between the amplitude of a read light beam reflected from pitted and non-pitted portions becomes less, and the signal-to-noise ratio of the disc decreases.

Figure 3:
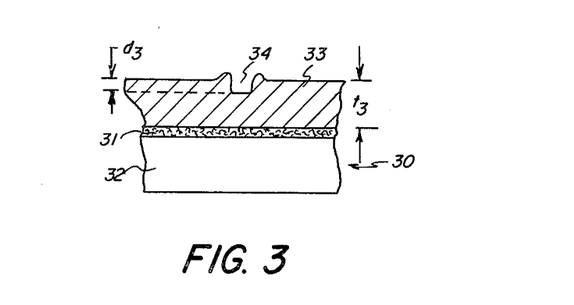
FIG. 3 is a cross-sectional view of a portion of an optical disc according to one embodiment of the present invention.
Figure 4:
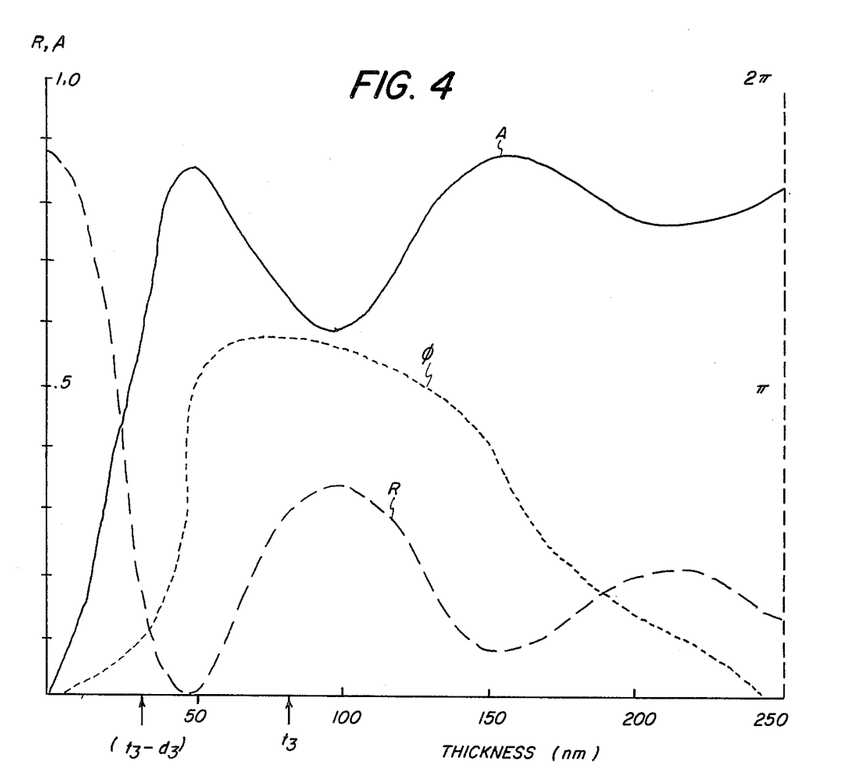
FIG. 4 is a graph illustrating the variation, with respect to recording layer thickness, of the absorption in the recording layer and of the reflectance and relative phase of write-read light reflected from a disc such as shown in FIG. 3.

Referring to FIGS. 3 and 4, the general approach of the present invention for obviating the above-described difficulties with prior single wavelength write-read systems will now be described. FIG. 3 illustrates in cross-section one portion of a disc 30, constructed according to one embodiment of the present invention, and which comprises a recording layer 33, overlying a reflective layer 31 on a support 32. FIG. 4 indicates, for an exemplary write-read wavelength, plots of: (1) the variation of absorption in recording layer 33 to variation in thickness of the recording layer (curve A), (2) the variation of the reflectance of disc 30 to variation in thickness of the recording layer 33 (curve R) and (3) the variation in light phase shift imparted by the disc 30 with respect to the variation in thickness of its recording layer 33 (curve $\phi$).

In accordance with the present invention the recording layer of disc 30 has a nominal thickness, $t_3$, yielding a significant reflectance of write-read light, rather than a minimal reflectance as in prior techniques. In the embodiment illustrated by FIGS. 3 and 4, the layer nominal thickness $t_3$ is selected (see FIG. 4) generally proximate the second reflection maximum of curve R, e.g., about 80 nm. This clearly does not provide for maximum coupling of energy into the entire recording layer during writing; however, we have found that a major proportion of the energy is absorbed in the vicinity of the surface of the recording layer and is sufficient for forming pits of a depth $d_3$ which are of a type highly useful in accordance with the approach of the present invention. That is, in the example shown, the recording layer of nominal thickness $t_3$ still couples about 60% of the incident recording energy versus 84% for layer thickness $t_1$ (corresponding to the first reflection minimum and first absorption maximum). However, in the case where the thickness $(t_3-d_3)=30$ nm the thickness $t_3$ layer couples ~48% of the incident light into a depth $t_3-30$ nm from its top surface while the thickness $t_1$ layer only couples ~54% into a depth $t_1-30$ nm from its top surface. It will be recognized that the resultant recording would not provide a high contrast signal using amplitude read-out techniques because the magnitude of light refelected from pitted and non-pitted portions is roughly equal (see curve R). However, when detection is accomplished using phase interference between pitted and non-pitted portions, a high contrast signal is provided. The large change in phase of the net light reflected from pitted and non-pitted portions can be noted by reference to curve $\phi$ of FIG. 4.

Several unique advantages are obtained by the disc construction and mode of operation of the present invention as described above. First, the nominal thickness $t_3$ affords significant disc reflectance to the write-read light, and this allows focus control signals to be derived from the write-read light directed at the recording surface. Second, the pit depth $d_3$ need not extend to the reflective layer 31. Thirdly, debris and crater rims formed around the pits (and which constitute recording layer thickness somewhat greater than the nominal thickness $t_3$) are substantially invisible to the phase interference detector; note the generally flat portion of the phase shift and reflection curves to the right of the nominal thickness, $t_3$.

An additional, highly significant attribute of this mode of operation is that dye fading in the recording layer subsequent to recording does not cause a decrease in read signal contrast. This can be appreciated more readily by reference to FIG. 5 which shows in dotted line the phase shift to thickness curve $\phi_2$ for the recording layer 33 when completely faded (i.e., substantially transparent to the write-read light) superimposed with the phase shift to thickness curve $\phi_1$ (solid line) for the recording layer in its unfaded initial condition. It will be noted that the signal contrast for phase interference read-out actually may improve in some respects with fading of the recording layer. That is, the shoulder portion of the curve becomes much flatter while the sharp phase shift change between pitted and non-pitted thickness regions remains.

From the foregoing explanations, it will be understood that the present invention contemplates record elements having a nominal thickness and optical constants that are optimized with respect to a selected write-read wavelength. Specifically, the optical constants and nominal thickness of the recording layer are so designed that a major proportion of the incident write-read light is absorbed by the recording layer (in the vicinity of its upper surface) but a significant minor proportion of incident write-read light will be reflected from the element. It will be understood that in this context, the term "significant minor proportion" means a proportion adequate to achieve focus error information prior to recording and good-contrast, phase interference read-out subsequent to recording. The elements' optical constants also are optimized with respect to the chosen write-read wavelength so that decreases from said predetermined nominal thickness cause relatively high magnitude phase shifts of reflected write-read light and so that increases from said predetermined nominal thickness cause relatively low magnitude phase shifts of reflected write-read light. Another criterion in selection of the optical constants and nominal thickness of the recording layer is that the depth of modulation imparted to write-read light by recorded (pitted) and unrecorded portions does not change substantially when the absorption to such read light decreases. Approaches for designing such elements will be explained in more detail subsequently; however, a description of some useful and preferred record element materials is appropriate first.

There are a wide variety of materials suitable for the supports and recording stratum of recording elements of the present invention. Important support characteristics are that it have a melting point high enough to avoid deformation and a smooth reflective surface. Materials such as reflective metals or glass or resin films (such as polyethylene terephthalate) coated with thin metal layers, e.g., 500 Å of aluminum, are exemplary but there are many others.

Although there are other recording layer materials that can be used in implementing element design according to the present invention, we have found dye-binder material to be particularly suitable.

A number of useful binders and dyes are disclosed in U.S. patent application Ser. No. 023,434, filed Mar. 23, 1979. That disclosure is incorporated herein for its teachings of such binders and dyes as well as for teachings of other examples of other element structures such as supports. In general it is preferred according to the present invention that the recording layer be an amorphous material. Thus the mixture of binder and absorptive material (e.g., the dye which absorbs at the writing wavelength) desirably are compatible to mix in such a way that no crystalline structure is formed.

Useful binders include for example cellulose acetate butyrate, polystyrene, polysulfonamide, Lexan (polycarbonate), cellulose nitrate, hydroabietyl alcohol (sold by Hercules Chemical Company as Abitol AUK 257), poly(ethyl methacrylate), poly(vinyl butyral), and combinations thereof. In some instances it may be useful to include a plasticizer in the mixture to achieve desired deformation capabilities. It is highly desirable that the selected recording layer be soluble in a solvent (e.g., such as cyclohexanone, acetone, benzene, xylene or the like) to facilitate coating.

There are a wide variety of useful dyes that can be considered for their absorptivity at the writing wavelength and compatibility with the binder of choice. A number of such dyes that are useful for consideration when writing and reading with an argon-ion laser (wavelength=488 nm) are described in the above-cited application, such disclosure being incorporated by reference. Additional useful light absorber-binder materials are disclosed in U.S. patent application Ser. No. 001,519, filed Jan. 8, 1979, *Research Disclosure* Publication No. 16167 by Industrial Opportunities Ltd., U.K., and U.S. application Ser. No. 124,382, entitled "α,β'-Bis-(Dialkylaminobenzylidene) Ketone Dyes and Their Use in Optical Recording Elements", and filed Feb. 25, 1980 in the names of Specht and Thomas, which are also incorporated herein by reference for that purpose.

The following procedure is one useful way to design a recording layer of optical constants and nominal thickness in accordance with the present invention:

First, based upon knowledge of the particular write-read wavelength with which the record element is to be used, a dye-binder combination is selected from materials such as described above. As previously explained, it is desirable that the dye-binder layer have a reflectance versus thickness relation exhibiting a high modulation with respect to the write-read wavelength at the first reflectance minimum. In this context, the term "high modulation" is intended to describe the condition where the second reflectance maximum has a substantially larger magnitude than the first reflectance minimum, e.g., as shown in FIGS. 2 and 4. In order to achieve this characteristic, the dye-binder combination desirably has a moderately high extinction coefficient with respect to the selected write-read light. An imaginary refractive index in the range from about 0.3 to about 0.8 is preferred for most useful dye-binder combinations. Additionally, it is preferred that the real refractive index of the dye-binder combination be greater than about 1.4 with respect to the selected write-read wavelength in order to provide a relative phase shift versus thickness variation curve exhibiting zones of relatively steep slope, i.e., relatively rapid phase change per thickness variation.

Having selected a dye-binder combination, the optical constants can be measured. The dependence on thickness of the reflectance and relative phase shift (such as $\phi$ and R in FIG. 4) for a non-faded recorded layer condition and the relative phase shift (such as $\phi_2$ in FIG. 5) for a completely faded recording layer condition can be calculated and plotted by procedures known to those skilled in the art. The curves shown in FIG. 4 are for the recording layer material and recording light wavelength described hereinafter in the specific detailed Example of a preferred recording element.

Based upon analysis of such curves, ranges of nominal recoring stratum thicknesses and pit depths which are operable in accordance with the present invention can be identified. More specifically, the nominal thickness should be selected to be sufficiently greater than the thickness corresponding to the first reflection minimum to afford (when the dye-binder layer is in a non-faded condition) adequate reflected light intensity for good contrast, phase-interference read-out with the selected read power and detection system. Because (1) the usable reading light power is constrained (in an unfaded condition) by the possibility of melting the dye-binder layer or fading the dye and (2) high bandwidth detection systems which produce low-noise signals from low-power light input are difficult to design, it is highly preferred to select the nominal thickness generally proximate the second reflectance maximum. In some systems it may be useful to select the nominal thickness slightly beyond the second reflectance maximum; however, it will be understood that this involves the formation of deeper pits. It is therefore highly preferred that the nominal thickness be selected along the positively sloping portion of the reflectance curve sufficiently beyond the first reflectance minimum to provide reflectance of a significant minor portion of the write-read wavelength when the dye-binder layer is in its unfaded (i.e., maximally absorptive) condition.

Figure 6:
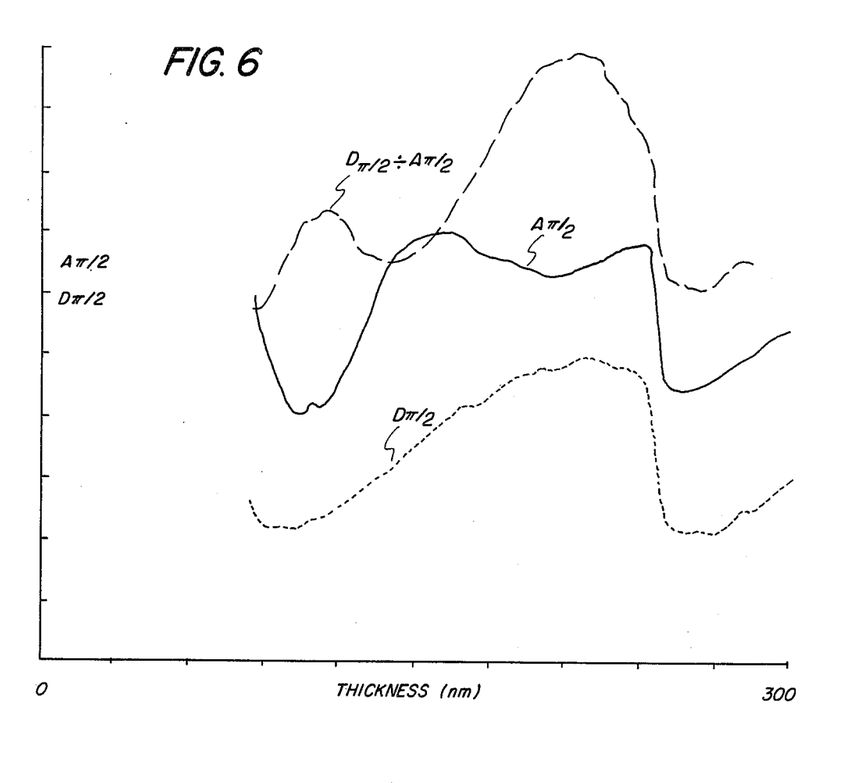
FIG. 6 is a graph indicating pit depth per constant $\pi/2$ phase shift, $D\pi/2$, and layer absorptance within that pit depth, $A\pi/2$. Superimposed on this graph is a dotted line representation of the quotient curve $D\pi/2 \div A\pi/2$ which constitutes a recording sensitivity parameter.

Having identified a range for selection of nominal thickness as indicated above, it is preferred to consider two other aspects in selection of a final nominal thickness. First, as will be understood by those skilled in the art, the power required for forming a pit of a given depth will be related to some extent to the interlayer interference characteristics of a particular recording stratum, these being governed by the thickness and optical constants of the various layers in the recording structure. The selection of a final nominal layer thickness can be further optimized by taking such interlayer interference characteristics into account. Reference to FIG. 6 will clarify how this can be done, bearing in mind that the general desired condition is to have a large fraction of the recording light absorbed near the upper portion of the recording layer.

In FIG. 6, the parameters $D\pi/2$, $A\pi/2$ and $D\pi/2 \div A\pi/2$ for an exemplary recording element (described in the subsequent Example) are plotted as a function of recording layer overall thickness. The $D\pi/2$ curve is illustrative of the physical pit depth required to yield a $\pi/2$ phase shift at varying recording layer thickness, and the $a\pi/2$ curve is illustrative of the percentage of light absorbed in the depth $D\pi/2$ at varying overall recording layer thicknesses. Those curves can be calculated based on the recording stratum's optical constants (the optical constants for the $A\pi/2$ parameter being of the recording layer in its unfaded condition and the $D\pi/2$ parameter being of that layer in its wholly faded condition). It is to be noted that the same analysis can be undertaken regarding other desired phase shifts, e.g., $\pi/4$, that might be used in particular detection systems. The $D\pi/2 \div A\pi/2$ curve thus is a plot indicating the power requirement for obtaining the desired phase shift (i.e., a $\pi/2$ shift) during recording and will be of assistance in final selection of nominal thickness. More specifically, it will be understood that recording sensitivity of a recording layer will be improved by selecting the nominal thickness of its recording layer within the operable nominal thickness range, identified as described above, and at or near a minimum of the power curve $D\pi/2 \pm A\pi/2$. Thus, considering the $D\pi/2 \div A\pi/2$ power curve of FIG. 6 in connection with the reflectance and phase shift curves at FIG. 4, it will be seen that a nominal thickness in the order of 80 to 90 nm will be desirable from the recording power viewpoint as well as from the criterion used to identify the operable nominal thickness range and described previously with respect to FIG. 4.

Figure 7A:
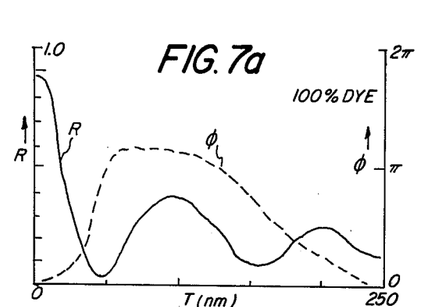
FIGS. 7a–h are reflectance and phase shift versus thickness variation curves for various stages of dye bleaching of a recording layer material.
Figure 7B:
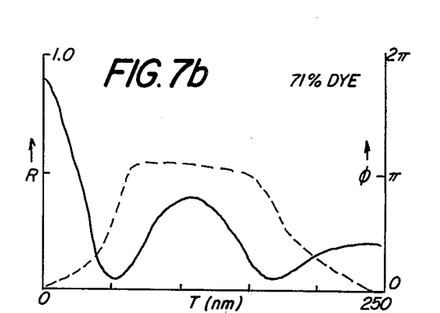
Figure 7C:
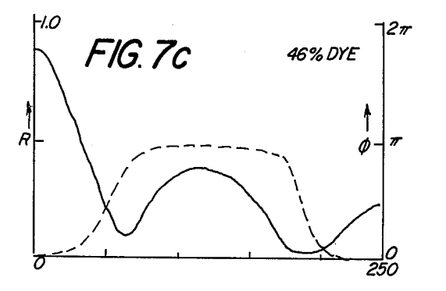
Figure 7D:
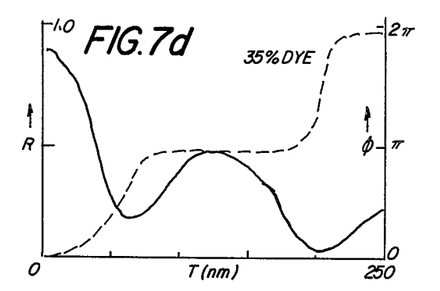
Figure 7E:
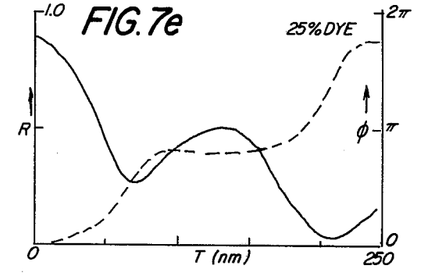
Figure 7F:
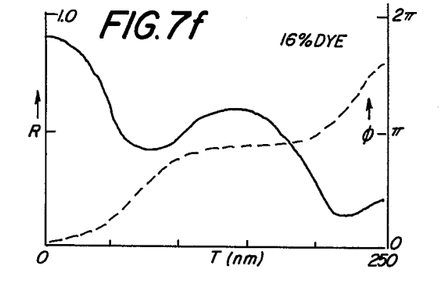
Figure 7G:
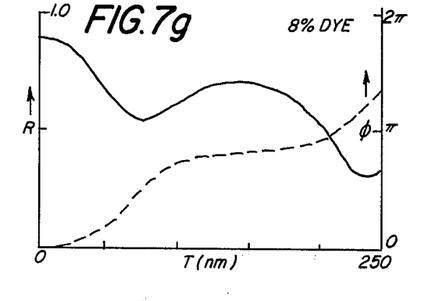
Figure 7H:
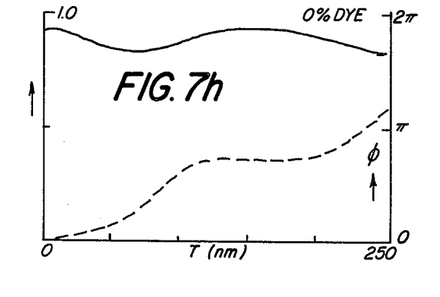

The other aspect which can be considered in selection of the final nominal thickness is the nature of the recording layer's reflection and phase shift characteristics during transition between a wholly unfaded and a wholly faded condition. That is, it is desirable to confirm (e.g. see FIGS. 7a–h) that the phase shift characteristic curve $\phi$ and reflectance curve R do not exhibit any change during the transition between the $\phi_1$ and $\phi_2$ shown in FIG. 5 that would prevent good phase read-out. The curves shown in FIG. 7a–h illustrate the manner in which the curve $\phi$ and curve R for a specific recording structure (described in the subsequent Example) change during various stages of the dye fading or bleaching cycle from the condition where the dye in the recording layer is 100% unbleached (FIG. 7a) to the condition where the dye is 0% unbleached (FIG. 7h). Curves such as FIGS. 7a–h can be plotted for a particular recording structure composition and write-read wavelength by measuring the optical constants of recording layer material at various thickness and stages of bleaching. However, more simply, the recording layer material characteristics at a nominal thickness selected in accordance with the previous guidelines can be checked at various stages of fading.

Having selected the dye-binder layer combination and the nominal recording layer thickness, the recording structure can be formed, e.g., by solvent coating techniques in accordance with these selections.

At this stage it is also useful to consider the procedure of recording, i.e., pit formation. From the foregoing discussion with respect to FIG. 4, it will be appreciated that it is desirable according to the present invention to provide recorded pit depths such that the magnitude of light reflected from pitted areas is sufficiently equal to that reflected from the non-pitted areas to provide a good phase interference read-out condition. This can be implemented by referring to the reflectance versus thickness variation curve of the record element. For example, once the nominal thickness is selected, the reflectance magnitude corresponding to that thickness can be noted and a point of approximately equal reflectance magnitude noted on the portion of the reflectance curve to the left (in the direction of decreased thickness) of the nominal thickness. The thickness which corresponds to this point will provide a useful "beneath-pit-thickness" in accordance with the present invention. As will be apparent, the difference between the nominal thickness and the beneath-pit-thickness will be the desired pit depth; and the recording parameters, e.g., power and disc rotation speed can be adjusted (e.g., emperically) to attain this pit depth.

It will be noted that a substantial phase difference will result between light reflected from pitted and non-pitted regions of the disc. In some instances it may be useful and preferred to adjust this phase difference for the particular detection scheme utilized in read-out, e.g., by slightly adjusting the selected nominal thickness and the selected pit depth while preserving the general requisite that the reflectance from pitted and non-pitted regions should be approximately equal. Likewise, it will be understood that the phase shift curves in both non-faded and faded conditions (and in intermediate bleaching stages, see FIGS. 7a-h) should be considered also in selection of pit depth to assure maintenance of an adequate $\Delta\phi$. In general, it is desirable also to allow a sufficient beneath-the-pit thickness to insulate te upper pit-forming region of the layer from substantial heat loss to the reflective layer during pit formation.

Such "beneath-the-pit" thickness should, in general, be greater than the thermal diffusion length "l" of the recording layer material. "l" is given by $l=\sqrt{K\tau}$, where K is the thermal diffusivity of the material and $\tau$ is the maximum time for which a point on the disc will be irradiated by the recording laser.

The follwing more specific example of one preferred embodiment of the present invention will aid in further understanding thereof.

EXAMPLE I

A recording layer coating solution was formed containing one part cellulose nitrate binder, one part of the dye SK-1 and 60 parts solvent (cyclohexanone). The dye SK-1 has the structural formula:

and the mode of preparation and utility of coumarin compounds such as SK-1 are described in *Research Disclosure* Publication No. 16167 by Industrial Opportunities Ltd., U.K. In this Example, the recording layer coating is to be formed on a smoothed circular glass substrate with a radius of about 150 nm and a thickness of about ¼-inch, having a reflective aluminum layer of about 500 Å. The following parameters characterized the significant optical constants of such a recording element with respect to the selected write-read light (488 Å):

|  | $\lambda_W$ (488) |
| --- | --- |
| Recording Layer: | $n_c = 2.25 + i0.45$ |
| Reflective Layer: | $n_c = 0.70 + i4.80$ |
| Substrate: | $n = 1.53$ |

Figure 5:
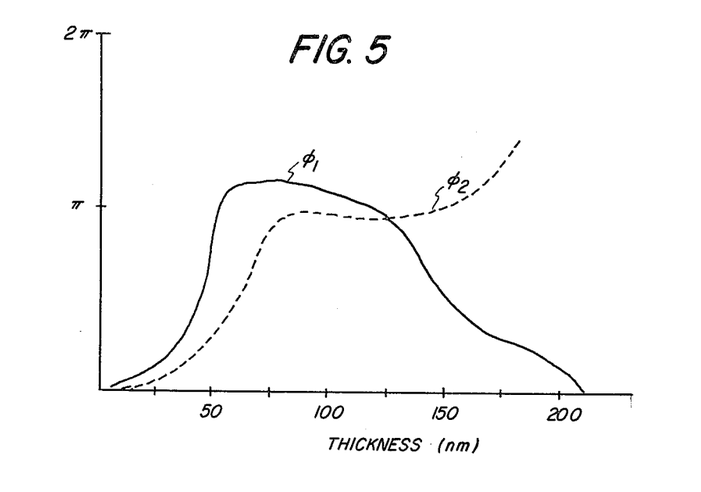
FIG. 5 is a graph showing the phase shift curve of FIG. 4 in superposition with a similar phase shift curve of the recording layer when faded to a condition of substantially zero absorption with respect to the write-read wavelength.

The curves in FIGS. 4-6 were plotted based on these optical constants of the recording element and a nominal thickness of about 850 Å selected based on the criteria discussed above. The coating solution described above was filtered and whirl coated onto the reflectively coated glass substrate and then dried so as to form a recording layer of the selected nominal thickness (about 850 Å).

The curves of FIGS. 7a-h were calculated based on measurements of such a coating and a mathematical model indicating how the real and imaginary refractive indices of such a coating composition vary with progressive dye bleaching. This confirmed that no changes in phase shift or reflective would prevent good phase read-out performance between the non-faded and faded conditions. Thus a pit depth of about 550 Å was selected at the nominal pit depth.

After complete bleaching of the recording layer (i.e. in the condition indicated in FIG. 7h) the optical constants of the elements are:

|  | $\lambda_W$ (488) |
| --- | --- |
| Recording Layer: | $n_c = 1.50 + i0.00$ |
| Reflective Layer: | $n_c = 0.70 + i4.80$ |
| Substrate: | $n = 1.53$ |

We have found a particularly effective mode for read-out of discs formed in accordance with the present invention to be point detection such as disclosed in U.S. patent application Ser. No. 161,486 entitled "Apparatus and Method for Reading Optical Discs" and filed June 20, 1980 in the name of D. G. Howe. When using this technique the relative phase shift due to pits may change from $\pi$ to $\pi/2$ as the disc bleaches, but the depth of modulation will remain essentially constant.

The invention has been described in detail with particular reference to certain preferred embodiments thereof, but it will be understood that variations and modifications can be effected within the spirit and scope of the invention.

What is claimed is:

1. A record element adapted for improved real-time writing and reading of high density information with light of a given wavelength, said element comprising a support having a smooth reflective surface and a recording stratum including a heat-deformable, dye-binder layer overlying said reflective surface;
   (a) said dye-binder layer having optical constants such that the reflectance versus thickness variation curve of said stratum, with respect to said given wavelength, exhibits a first reflectance minimum having a high depth of modulation; and
   (b) said stratum having a nominal thickness sufficiently greater than the thickness corresponding to said first reflection minimum to effect reflection of a significant minor proportion of light of said given wavelength.

2. The invention defined in claim 1 wherein said nominal thickness is proximate a transition, from a zone of gradual slope to a zone of rapid slope, in the relative phase shift versus thickness variation curve of said recording stratum with respect to light of said given wavelength, whereby decreases in thickness of said recording stratum during deformation recording will yield substantial differences in relative phase shift between reading light of said given wavelength reflected from said record element.

3. The invention defined in claim 2 wherein the optical constants of said recording layer are such that such a transition zone of the recording stratum's relative phase shift versus thickness variation curve continues to be proximate said nominal thickness as the absorption of said recording layer to said given wavelength decreases.

4. The invention defined in claim 1 wherein the real refractive index of said recording layer at said given wavelength is greater than about 1.4.

5. The invention defined in claim 1 wherein the imaginary refractive index of said recording layer is in the range of from about 0.3 to about 0.8.

6. The invention defined in claim 1 wherein the real refractive index of said recording layer at said given wavelength is greater than about 1.4 and wherein the imaginary refractive index of said recording layer is in the range of from about 0.3 to about 0.8.

7. A record element adapted for improved real-time writing and reading of high density information with light of a given wavelength, said element comprising a support having a smooth reflective surface and a recording stratum including a heat-deformable, dye-binder layer overlying said reflective surface;
   (a) said dye-binder layer having optical constants such that the reflectance versus thickness variation curve of said stratum, with respect to said given wavelength, exhibits a second reflectance maximum of magnitude substantially larger than that of its first reflectance minimum; and
   (b) said stratum having a nominal thickness generally proximate the thickness corresponding to said second reflectance maximum.

8. The invention defined in claim 7 wherein said nominal thickness is proximate a transition, from a zone of gradual slope to a zone of rapid slope, in the relative phase shift versus thickness variation curve of said recording stratum with respect to light of said given wavelength, whereby decreases in thickness of said recording stratum during deformation recording will yield substantial differences in relative phase shift between reading light of said given wavelength reflected from recorded and non-recorded portions of said record element.

9. The invention defined in claim 8 wherein the optical constants of said recording layer are such that such a transition zone of the recording stratum's relative phase shift versus thickness variation curve continues to be proximate said nominal thickness as the absorption of said recording layer to said given wavelength decreases.

10. The invention defined in claim 7 wherein the real refractive index of said recording layer at said given wavelength is greater than about 1.4.

11. The invention defined in claim 7 wherein the imaginary refractive index of said recording layer is in the range of from about 0.3 to about 0.8.

12. The invention defined in claim 7 wherein the real refractive index of said recording layer at said given wavelength is greater than about 1.4 and wherein the imaginary refractive index of said recording layer is in the range of from about 0.3 to about 0.8.

13. In a record element of the type comprising a support having a smooth reflective surface and a recording stratum, including a heat-deformable, dye-binder layer, overlying said reflective surface, said element containing information in the form of a plurality of discrete, high density pits formed by thermal deformation of said dye-binder layer by a beam of light of a given wavelength to which said dye is strongly absorptive, the improvement wherein:
   (a) said dye-binder layer has optical constants such that the reflectance versus thickness variation curve of said stratum, with respect to said given wavelength, exhibits a first reflectance minimum having a high depth of modulation;
   (b) said stratum has a nominal thickness sufficiently greater than the thickness corresponding to said first reflection minimum to effect reflection of a significant minor porportion of light of said given wavelengths; and
   (c) said pits are recorded to a depth such that, upon reading of said record element with a beam of radiation of said given wavelength, the magnitude of such radiation reflected from pitted and non-pitted portions of said element is approximately equal.

14. The invention defined in claim 13 wherein said nominal thickness is proximate a transition, from a zone of gradual change to a zone of rapid change, in the relative phase shift versus thickness variation curve of said recording stratum with respect to light of said given wavelength, whereby the decreased thickness of said recording stratum in pitted regions yield substantial relative phase changes to light of said given wavelength reflected from said record element.

15. The invention defined in claim 13 wherein the real refractive index of said dye-binder layer at said given wavelength is greater than about 1.4.

16. The invention defined in claim 13 wherein the imaginary refractive index of said dye-binder layer is in the range of from about 0.3 to about 0.8.

17. The invention defined in claim 13 wherein the real refractive index of said dye-binder layer at said given wavelength is greater than about 1.4 and wherein the imaginary reflective index of said dye-binder layer is in the range of from about 0.3 to about 0.8.

18. In a record element of the type comprising a support having a smooth reflective surface and a recording stratum, including a heat-deformable, dye-binder layer, overlying said reflective surface, said element containing information in the form of a plurality of discrete, high density pits formed by thermal deformation of said dye-binder layer by a beam of light of a given wavelength to which said dye is strongly absorptive, the improvement wherein:
(a) said dye-binder layer has optical constants such that the reflectance versus thickness variation curve of said stratum, with respect to said given wavelength, exhibits a second reflectance maximum of magnitude substantially larger than that of the first reflectance minimum;
(b) said stratum has a nominal thickness generally proximate the thickness corresponding to said second reflectance maximum; and
(c) said pits are recorded to a depth such that, upon reading of said record element with a beam of radiation of said given wavelength, the magnitude of such radiation reflected from pitted and non-pitted portions of said element is approximately equal.

19. The invention defined in claim 18 wherein said nominal thickness is proximate a transition, from a zone of gradual change to a zone of rapid change, in the relative phase shift versus thickness variation curve of said recording stratum with respect to light of said given wavelength, whereby reading light of said given wavelength reflected from pitted and non-pitted regions of said record element differ substantially in phase.

20. The invention defined in claim 18 wherein the real refractive index of said dye-binder layer at said given wavelength is greater than about 1.4.

21. The invention defined in claim 18 wherein the imaginary refractive index of said dye-binder layer is in the range of from about 0.3 to about 0.8.

22. The invention defined in claim 18 wherein the real refractive index of said dye-binder layer at said given wavelength is greater than about 1.4 and wherein the imaginary refractive index of said dye-binder layer is in the range of from about 0.3 to about 0.8.

23. A method for the real-time, optical writing and reading of high density information with light of a given wavelength, said method comprising:
(a) scanning a record element of the type having a recording stratum, including a heat-deformable dye-binder layer overlying a reflectively surfaced support, with respect to a writing laser beam of said given wavelength, said dye binder layer having optical constants such that the reflectance versus thickness variation curve of said stratum, with respect to said given wavelength, exhibits a first reflectance minimum having a high depth of modulation and said stratum having a nominal thickness sufficiently greater than the thickness corresponding to said first reflection minimum to effect reflection of a significant minor proportion of light of said given wavelength;
(b) modulating the intensity of said laser beam to form tracks comprising a plurality of discrete thermal deformation pits, said pits being recorded to a depth such that, upon reading of said record element with a reading laser beam of said given wavelength, the proportions of such beam reflected from pitted and non-pitted portions of said element are approximately equal;
(c) scanning such tracks with a reading laser beam of radiation of said given wavelength which has an energy less than will effect melting of the scanned dye-binder layer; and
(d) sensing the reading beam, reflected from said record element, with a far field detector adapted to detect and produce output signals primarily in response to differences in phase of the read beam reflected from pitted and non-pitted portions of said element.

24. The invention defined in claim 23 wherein the real refractive index of said dye-binder layer at said given wavelength is greater than about 1.4.

25. The invention defined in claim 23 wherein the imaginary refractive index of said dye-binder layer is in the range of from about 0.3 to about 0.8.

26. The invention defined in claim 23 wherein the real refractive index of said dye-binder layer at said given wavelength is greater than about 1.4 and wherein the imaginary refractive index of said dye-binder layer is in the range of from about 0.3 to about 0.8.

27. The invention defined in claim 23 wherein said nominal thickness is proximate a transition, from a zone of gradual change to a zone of rapid change, in the relative phase shift versus thickness variation curve of said recording stratum with respect to said given wavelength, whereby decreases in thickness of said recording stratum during deformation recording will yield substantial relative phase changes in said reading portions reflected from pitted and non-pitted regions of said record element.

28. A method for the real-time, optical writing and reading of high density information with light of a given wavelength, said method comprising:
(a) scanning a record element of the type having a recording stratum, including a heat-deformable dye-binder layer overlying a reflectively surfaced support, with respect to a beam of light of said given wavelength, said dye binder layer having optical constants such that the reflectance versus thickness variation curve of said stratum, with respect to said given wavelength, exhibits a second reflectance maximum of magnitude substantially larger than that of its first reflectance minimum and said stratum having a nominal thickness generally proximate the thickness corresponding to said second reflectance maximum;
(b) modulating the intensity of said beam of radiation to form tracks comprising a plurality of discrete thermal-deformation pits, said pits being recorded to a depth such that, upon reading of said record element with a reading beam of said given wavelength, the magnitudes of such light reflected from pitted and non-pitted portions of said element are approximately equal;
(c) scanning such tracks with a reading beam of light of said given wavelength which has an energy slightly less than will effect melting of the scanned dye-binder layer; and
(d) sensing the reading beam light, reflected from said record element, with a far field detector adapted to detect and produce output signals primarily functionally related to differences in phase of the light reflected from pitted and non-pitted portions.

29. The invention defined in claim 28 wherein the real refractive index of said dye-binder layer at said given wavelength is greater than about 1.4.

30. The invention defined in claim 28 wherein the imaginary refractive index of said dye-binder layer is in the range of from about 0.3 to about 0.8.

31. The invention defined in claim 28 wherein the real refractive index of said dye-binder layer at said given wavelength is greater than about 1.4 and wherein the imaginary refractive index of said dye-binder layer is in the range of from about 0.3 to about 0.8.

32. The invention defined in claim 28 wherein said nominal thickness is proximate a transition, from a zone of gradual change to a zone of rapid change, in the relative phase shift versus thickness variation curve of said recording stratum with respect to light of said given wavelength, whereby reading light of said given wavelength reflected from pitted and non-pitted regions of said record element is substantially different in phase.

33. Apparatus for real-time optical writing and reading of high density information with light of a given wavelength, said apparatus comprising:
(a) a record element comprising a support having a smooth reflective surface and a recording stratum including a heat-deformable, dye-binder layer overlying said reflective surface, said dye-binder layer having optical constants such that the reflectance versus thickness variation curve of said stratum, with respect to said given wavelength, exhibits a first reflectance minimum having a high depth of modulation and said stratum having a nominal thickness sufficiently greater than the thickness corresponding to said first reflectance minimum to effect reflection of a significant minor proportion of light of said given wavelength;
(b) means for scanning said record element with a laser beam of said given wavelength;
(c) control means for:
(1) in a writing mode, controlling the intensity of said laser beam so as to thermally form a plurality of discrete pits of generally predetermined depth in said layer in a pattern representing such information, said predetermined pit depth being such that, upon reading of said record element with said laser beam, the magnitude of such light reflected from pitted and non-pitted portions of said element is approximately equal; and
(2) in a reading mode, controlling said radiation beam so as to provide a uniform illumination of recorded pits of slightly less intensity than will melt said layer; and
(d) means for sensing the reading radiation reflected from said record element with a far field detector adapted to detect and produce output signals primarily in response to differences in the phase of the read light beam reflected from pitted and non-pitted portions of said record element.

34. The invention defined in claim 33 wherein the real refractive index of said layer at said given wavelength is greater than about 1.4.

35. The invention defined in claim 33 wherein the imaginary refractive index of said layer is in the range of from about 0.3 to about 0.8.

36. The invention defined in claim 33 wherein the real refractive index of said layer at said given wavelength is greater than about 1.4 and wherein the imaginary refractive index of said layer is in the range of from about 0.3 to about 0.8.

37. The invention defined in claim 33 wherein said nominal thickness is proximate a transition, from a zone of gradual change to a zone of rapid change, in the relative phase shift versus thickness variation curve of said recording stratum with respect to light of said given wavelength, whereby decreases in thickness of said recording stratum incident to pit formation yield a substantial change in relative phase of reflected reading light.

38. Apparatus for real-time optical writing and reading of high density information with a laser beam of a given wavelength, said apparatus comprising:
(a) a record element comprising a support having a smooth reflective surface and a recording stratum including a heat-deformable, dye-binder layer overlying said reflective surface, said dye-binder layer having optical constants such that the reflectance versus thickness variation curve of said stratum, with respect to said given wavelength, exhibits a second reflectance maximum of magnitude substantially larger than that of the first reflectance minimum and said stratum having a nominal thickness generally proximate the thickness corresponding to said second reflectance maximum;
(b) means for scanning said record element with a laser beam of said given wavelength;
(c) control means for:
(1) in a writing mode, controlling the intensity of said laser beam so as to thermally deform a plurality of discrete pits of generally predetermined depth in said layer in a pattern representing such information, said predetermined pit depth being such that, upon reading of said record element with said laser beam, the magnitude of such light reflected from pitted and non-pitted portions of said element is approximately equal; and
(2) in a reading mode, controlling said radiation beam so as to provide a uniform illumination of recorded pits of slightly less intensity than will melt said dye-binder layer; and
(d) means for sensing the reading radiation reflected rom said record element with a far field detector adapted to produce output signals primarily in response to differences in phase of light reflected from pitted and non-pitted portions of said element.

39. The invention defined in claim 38 wherein the real refractive index of said layer at said given wavelength is greater than about 1.4.

40. The invention defined in claim 38 wherein the imaginary refractive index of said layer is in the range of from about 0.3 to about 0.8.

41. The invention defined in claim 38 wherein the real refractive index of said layer at said given wavelength is greater than about 1.4 and wherein the imaginary refractive index of said layer is in the range of from about 0.3 to about 0.8.

42. The invention defined in claim 38 wherein said nominal thickness is proximate a transition, from a zone of gradual change to a zone of rapid change, in the relative phase shift versus thickness variation curve of said recording stratum with respect to light of said given wavelength, whereby reading light of said given wavelength reflected from pitted and non-pitted regions of said record element differs substantially in phase.

43. A method of fabricating a record element adapted for real-time optical writing and reading with light of a given wavelength, said method comprising:
(a) forming a support having a smooth, light-reflective surface;
(b) preparing a dye-binder composition having optical constants such that the reflectance versus thickness variation curve of said stratum, with respect to said given wavelength, exhibits a second reflectance maximum of substantially larger magnitude than that of the first reflectance minimum; and (c) forming a layer of said dye-binder composition over said light-reflective surface having a nominal thickness proximate the thickness corresponding to said second reflectance maximum.

44. A method of fabricating a record element adapted for real-time optical writing and reading with light of a given wavelength, said method comprising:

(a) forming a support having a smooth, light-reflective surface;

(b) preparing a dye-binder composition adapted to form a recording stratum having a real-refractive index, with respect to light of said given wavelength, greater than about 1.4 and having an imaginary refractive index with respect to light of said given wavelength in the range of from about 0.3 to about 0.8 whereby the reflectance versus thickness variation characteristic will exhibit a first reflection minimum having a high depth of modulation; and (c) forming over said reflective surface a recording stratum comprising a layer of said dye-binder composition, the nominal thickness of said stratum being sufficiently greater than the thickness corresponding to the first reflection minimum of said dye-binder composition to effect reflection of a significant minor proportion of light of said given wavelength.

* * * * *